United States Patent [19]
Tadokoro et al.

[11] Patent Number: 5,518,509
[45] Date of Patent: May 21, 1996

[54] METHOD FOR PRODUCING A HYDROGEN ABSORBING ALLOY ELECTRODE

[75] Inventors: Motoo Tadokoro; Fusago Mizutaki; Hiroshi Fukuda, all of Itano, Japan

[73] Assignee: Sanyo Electric Co., Ltd., Moriguchi, Japan

[21] Appl. No.: 297,778

[22] Filed: Aug. 30, 1994

[30] Foreign Application Priority Data

Aug. 31, 1993 [JP] Japan .................... 5-216245

[51] Int. Cl.$^6$ ............... H01M 4/04; H01M 4/38
[52] U.S. Cl. .................. 29/623.5; 148/512; 420/900; 427/123
[58] Field of Search ............ 29/623.5; 148/512; 427/123, 216, 436; 420/900

[56] References Cited

U.S. PATENT DOCUMENTS 5,173,109  12/1992  Iantosca ................. 427/436

FOREIGN PATENT DOCUMENTS 0271043  6/1988  European Pat. Off. .
0273625  7/1988  European Pat. Off. .
0432342A1  6/1991  European Pat. Off. .
4-310258  11/1992  Japan .

OTHER PUBLICATIONS

Patent Abstracts of Japan, vol. 17, No. 144, Mar. 23, 1993 (4–318106).
Patent Abstracts of Japan, vol. 17, No. 152, Mar. 25, 1993 (4–319258).
Patent Abstracts of Japan, vol. 17, No. 173, Apr. 4, 1993 (4–328252).
Patent Abstracts of Japan, vol. 13, No. 381, Aug. 23, 1989 (1–132048).

Primary Examiner—Stephen Kalafut
Attorney, Agent, or Firm—Armstrong, Westerman, Hattori, McLeland & Naughton

[57] ABSTRACT

A method for producing a hydrogen-absorbing alloy electrode including a step of treating the surface of a hydrogen-absorbing alloy. The surface treatment is applied to hydrogen-absorbing alloy having ununiform distortion of $3.5 \times 10^{-3}$ or less by using only an acid solution whose pH value is between 0.5 and 3.5.

12 Claims, 4 Drawing Sheets

5,518,509

METHOD FOR PRODUCING A HYDROGEN ABSORBING ALLOY ELECTRODE

BACKGROUND OF THE INVENTION (1) Field of the Invention

The present invention relates to a method for producing a hydrogen-absorbing alloy electrode including a hydrogen-absorbing alloy that reversibly absorbs and desorbs hydrogen at atmospheric pressure, and more particularly to treating the surface of the hydrogen-absorbing alloy.

(2) Description of the Related Art

Lead storage cells and nickel-cadmium storage cells have been widely used so far; however, metal-hydrogen alkaline storage cells are now attracting attention. A metal-hydrogen alkaline storage cell is composed of a negative electrode using a hydrogen-absorbing alloy as an active material and a positive electrode using a metallic oxide such as a nickel hydroxide as an active material. These metal-hydrogen alkaline storage cells have advantages of being lighter in weight, larger in capacity, and higher in energy density than these conventional storage cells.

The hydrogen-absorbing alloy used in a metal-hydrogen alkaline storage cell is subjected to various surface treatments in order to improve the cell characteristics.

For example, Japanese Patent Publication No. 4-79474 discloses the use of an alkaline aqueous solution for a surface treatment of the hydrogen-absorbing alloy. The surface treatment realizes the formation of a nickel-rich layer over the surface of the hydrogen-absorbing alloy. The nickel-rich layer accelerates smooth absorption of oxygen gas generated from the positive electrode during overcharge because nickel works as a catalyzer in a reducing reaction of oxygen. Consequently, the rise in cell internal pressure is restricted and charge/discharge cycle characteristics are improved.

Japanese Laid-open Patent Application No. 3-98259 discloses the use of hot water of 60° C. or higher for a surface treatment of a hydrogen-absorbing alloy. This method also realizes the formation of a nickel rich layer with the same effects as the above case.

However, these surface treatments to form a nickel rich layer have an undesirable side effect of producing hydroxide. The hydroxide increases the contact resistance among hydrogen-absorbing alloy particles or decreases the activity of the hydrogen-absorbing alloys, thereby deteriorating the high rate charge/discharge characteristics and low temperature discharge characteristics in the initial charge/discharge cycle.

The following methods have been proposed for improving the high rate charge/discharge characteristics and low temperature discharge characteristics in the initial charge/discharge cycle.

1) Japanese Laid-open Patent Application No. 3-152868: A fine oxide layer which obstructs the initial activation of a hydrogen-absorbing alloy is removed through an acid treatment before an alkaline treatment is applied to the alloy. As a result, a hydrogen-absorbing alloy electrode with both excellent high rate charge/discharge characteristics and gas absorption characteristics is obtained.

2) Japanese Laid-open Patent Application No. 1-132048: An acid treatment is applied to a hydrogen-absorbing alloy, and a sintered electrode with excellent high rate charge/discharge characteristics and charge/discharge cycle characteristics is produced by using the alloy.

However, according to the former method, the alkaline treatment results in the formation of hydroxide, and the low temperature discharge characteristics are not satisfactory. The latter method, on the other hand, has a problem that the complicated producing process of the sintered electrode leads to low productivity.

If the acid treatment is applied to a non-sintered electrode, acid melts the alloy surface, thereby generating hydrogen. The generated hydrogen is re-absorbed by the alloy, and the alloy has cracks on its surface during the re-absorption. As a result, new active surfaces are formed which improve the activity of the alloy. If the cracks grow larger, however, the alloy may be deteriorated through oxidization with the progress of charge/discharge cycles. The deterioration of the alloy lowers the charge/discharge efficiency and the charge/discharge cycle characteristics.

SUMMARY OF THE INVENTION

In view of the foregoing problems, an object of the present invention is to provide a method for producing a hydrogen-absorbing alloy electrode with excellent high rate charge/discharge characteristics and excellent low temperature discharge characteristics in the initial charge/discharge cycle, and long charge/discharge cycle life.

The above object can be achieved by a method for producing a hydrogen-absorbing alloy electrode including a step of treating a surface of a hydrogen-absorbing alloy having ununiform distortion of $3.5 \times 10^{-3}$ or less. The surface treatment step is carried out by using only an acid aqueous solution whose pH value is between 0.5 and 3.5.

The method may be further include the following steps.

A step of melting and cooling elements composing the hydrogen-absorbing alloy, thereby producing a hydrogen-absorbing alloy ingot.

A step of pulverizing the hydrogen-absorbing alloy ingot into powder, the pulverization step including the surface treatment step.

A step of producing a hydrogen-absorbing alloy electrode from the hydrogen-absorbing alloy powder.

The surface treatment step may be composed of pulverizing the hydrogen-absorbing alloy ingot in the acid aqueous solution.

The method may include the following steps.

A step of producing a hydrogen-absorbing alloy electrode from the hydrogen-absorbing alloy powder, the surface treatment step being applied to the hydrogen-absorbing alloy powder between the pulverization step and the production step.

The surface treatment step may be composed of soaking the hydrogen-absorbing alloy powder in the acid aqueous solution.

The method may further comprise the following steps:

A step of producing a hydrogen-absorbing alloy base electrode from the hydrogen-absorbing alloy powder, the surface treatment being applied to said hydrogen-absorbing alloy base electrode after the production step of the hydrogen-absorbing alloy base electrode.

The above object can be achieved on the following grounds.

When a hydrogen-absorbing alloy is subjected to the surface treatment with an acid aqueous solution whose pH value is between 0.5 and 3.5, the surface of the alloy melts and hydrogen is generated. The hydrogen thus generated is re-absorbed by the alloy, which has cracks on its surface during the re-absorption. As a result, new active surfaces are formed which improve the activity of the alloy. Thus, the high rate discharge characteristics and low temperature discharge characteristics are improved in accordance with the improvement of the alloy activity.

In addition, the hydrogen-absorbing alloy of the present invention has excellent crystallization and its ununiform distortion is $3.5 \times 10^{-3}$ or less. Consequently, the formation of large cracks are prevented through the acid treatment, and the pulverization does not proceed too much with the progress of the charge/discharge cycle. These features prevent the charge/discharge cycle to be shortened. Since other components of the alloy have higher solubility than nickel as the main component in an acid area, they easily melt in an acid solution. As a result, the nickel-rich layer is formed on the surface of the hydrogen-absorbing alloy. The layer accelerates smooth absorption of oxygen gas generated from the positive electrode during overcharge because nickel works as a catalyzer. As a result, the rise in cell internal pressure is restricted, and the oxygen gas is prevented from leaking out through a safety vent. Consequently, charge/discharge cycle characteristics are improved.

Thus, according to the method for producing a hydrogen-absorbing alloy electrode of the present invention, discharge characteristics are improved by treating a hydrogen-absorbing alloy with acid.

Then, ununiform distortion is determined without the application of an alkaline treatment which gives bad effects to the discharge characteristics, thereby improving the charge/discharge cycle.

Furthermore, controlling the cooling rate of hydrogen-absorbing alloy melt and applying anneal treatment to a resulting hydrogen-absorbing alloy ingot allows ununiform distortion to be $3.5 \times 10^{-3}$ or less.

The ununiform distortion is a cause of broading Debye ring and is measured through Laue camera or the like. The value is defined through the following formula.

$$\eta = \frac{\beta'}{2 \tan \theta} \quad \text{[formula]}$$

$\eta$: ununiform distortion
$\beta$: integral amplitude
$\theta$: Bragg's diffraction

DESCRIPTION OF THE PREFERRED EMBODIMENTS

<EMBODIMENT 1>

[Method for producing hydrogen-absorbing alloy electrode]

Figure 1:
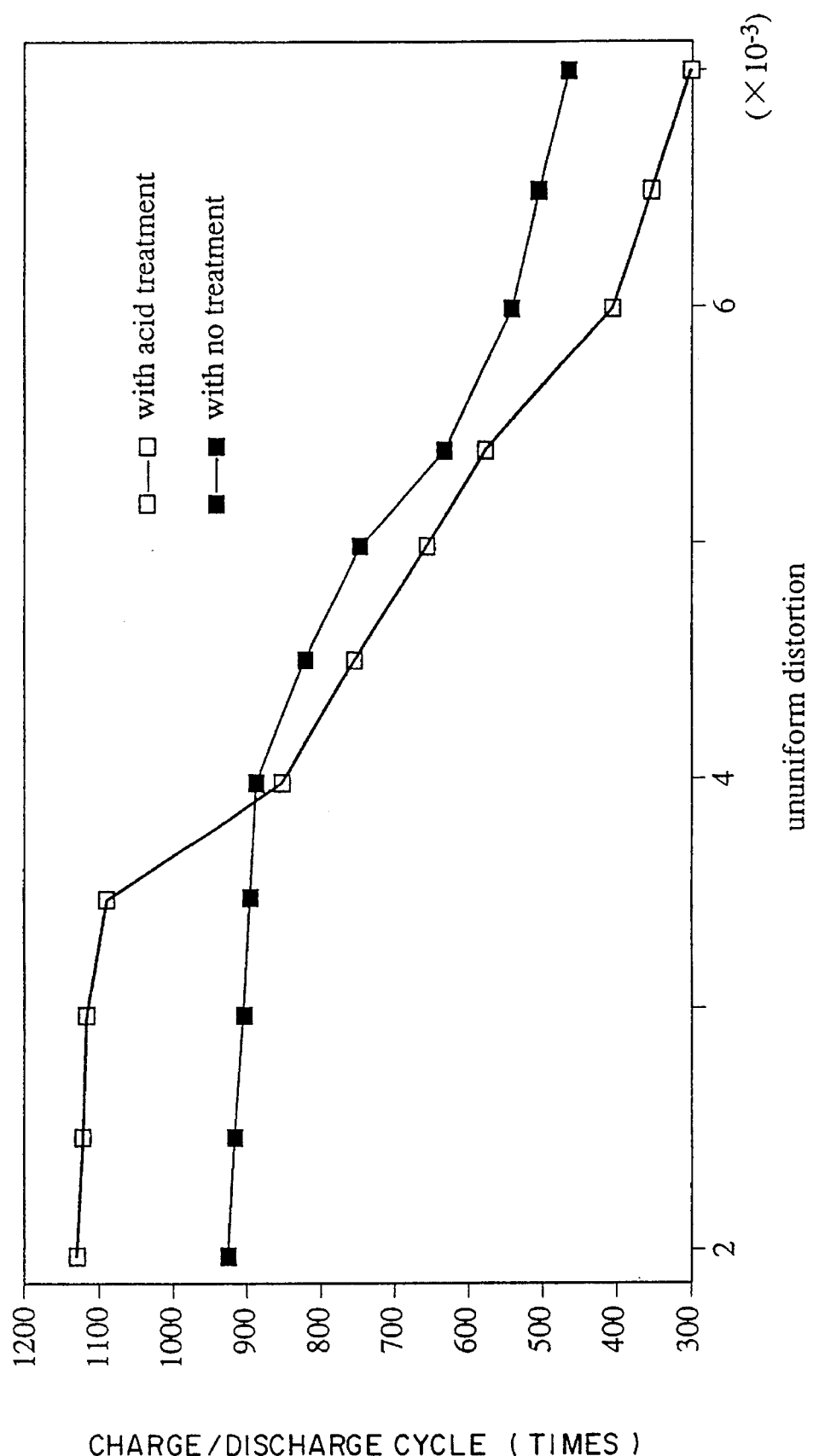
FIG. 1 is a graph showing the relationship between the ununiform distortion and the charge/discharge cycle.

First, commercially available Mm (misch metal, a mixture of rare-earth elements such as La, Ce, Nd, and Pr), Ni, Co, Al, and Mn were mixed in an elemental ratio of 1: 3.4: 0.8: 0.2: 0.6 and melted in a high frequency melting furnace under argon inert atmosphere. The resulting melt was cooled to produce a hydrogen-absorbing alloy ingot expressed by $MmNi_{3.4}Co_{0.8}Al_{0.2}Mn_{0.6}$. The ununiform distortion of the alloy ingot at this point was $5.4 \times 10^{-3}$, and the hydrogen-absorbing alloy ingot is hereinafter referred to as the alloy ingot $M_1$.

The alloy ingot $M_1$ was subjected anneal treatment for eight hours at 1000° C. in an inert gas and then pulverized into powder whose average diameter was 150 μm under an inert gas atmosphere.

The ununiform distortion of the alloy powder thus produced was $2.5 \times 10^{-3}$. The hydrogen-absorbing alloy powder is hereinafter referred to as the alloy powder $M_2$.

The alloy powder $M_2$ was soaked for twenty minutes in a hydrochloric acid aqueous solution whose pH value was 1, well rinsed with ion exchange water, and dried, thereby producing hydrogen-absorbing alloy powder for electrode.

The alloy powder for electrode was kneaded into a paste with 5 wt % of polytetrafluoroethylene powder as a binder to the active material. The paste was applied over both surfaces of a collector made of punching metal and the collector was pressed to produce a non-sintered hydrogen-absorbing alloy electrode.

[Assembling of a cell]

The hydrogen-absorbing alloy electrode produced as above and a well-known sintered nickel electrode were coiled together via an unwoven cloth separator to produce an electrode assembly. The electrode assembly was put into an outer can, which was sealed after a potassium hydroxide aqueous solution of 30 wt % was pored thereinto. Consequently, a cylindrical nickel-hydrogen storage cell with a theoretical capacity of 1000 mAh was produced.

The nickel-hydrogen storage cell thus produced is hereinafter referred to as $A_1$ cell.

<EMBODIMENT 2>

The hydrogen-absorbing alloy ingot $M_1$ (ununiform distortion : $2.5 \times 10^{-3}$) which had been subjected to anneal treatment was primarily pulverized into powder whose average diameter was 500 μm or smaller in an inert gas. The alloy powder was further pulverized into finer powder whose average diameter was 150 μm or smaller by using a ball mill in a hydrochloric acid aqueous solution whose pH value was 1. Then, the finer alloy powder was well rinsed with ion exchange water and dried, thereby producing hydrogen-absorbing alloy powder for electrode.

The alloy powder thus produced was used to produce an electrode, and the electrode was used to produce a cell in the same manner as Embodiment 1.

The cell thus produced is hereinafter referred to as $A_2$ cell.

(Comparative Example 1)

The alloy powder $M_2$ was soaked for an hour at 80° C. in a potassium hydroxide aqueous solution whose pH was 14, well rinsed with ion exchange water, and dried, thereby producing hydrogen-absorbing alloy powder for electrode.

The alloy powder thus produced was used to produce an electrode, and the electrode was used to produce a cell in the same manner as Embodiment 1.

The cell thus produced is hereinafter referred to as $X_1$ cell.

(Comparative Example 2)

After having been subjected to an acid surface treatment in the same manner as Embodiment 1, the alloy powder $M_2$ was further subjected to with an alkaline surface treatment in the same manner as Comparative Example 1 without drying. The alloy powder $M_2$ thus treated was well rinsed with ion exchange water and dried, thereby producing hydrogen-absorbing alloy powder for electrode.

The alloy powder thus produced was used to produce an electrode, and the electrode was used to produce a cell in the same manner as Embodiment 1.

The cell thus produced is hereinafter referred to as $X_2$ cell.

(Comparative Example 3)

The alloy powder $M_2$ was used to produce an electrode without applying any treatment and the electrode was used to produce a cell in the same manner as Embodiment 1.

The cell thus produced is hereinafter referred to as $X_3$ cell.

(Comparative Example 4)

The hydrogen-absorbing alloy ingot $M_1$ (ununiform distortion : $5.4 \times 10^{-3}$) which had not been subjected to anneal treatment was pulverized into powder whose average diameter was 150 µm or smaller under an inert gas, thereby producing hydrogen-absorbing alloy powder for electrode (ununiform distortion: $5.4 \times 10^{-3}$).

The hydrogen-absorbing alloy powder is hereinafter referred to as the alloy powder $M_3$.

The alloy powder $M_3$ was subjected to acid surface treatment in the same manner as Embodiment 1, well rinsed with ion exchange water, and dried to produce a hydrogen-absorbing alloy powder for electrode.

The alloy powder $M_3$ was used to produce an electrode and the electrode was used to produce a cell in the same manner as Embodiment 1.

The cell thus produced is hereinafter referred to as $X_4$ cell.

(Comparative Example 5)

The hydrogen-absorbing alloy ingot $M_1$ (ununiform distortion : $5.4 \times 10^{-3}$) which had not been subjected to anneal treatment was primarily pulverized into powder whose average diameter was 500 µm or smaller in the same manner as Embodiment 2. Then, the pulverized powder was further pulverized into finer powder whose average diameter was 150 µm or smaller by using a ball mill in a hydrochloric acid aqueous solution whose pH value was 1. Then, the finer alloy powder was well rinsed with ion exchange water and dried, thereby producing hydrogen-absorbing alloy powder for electrode.

The hydrogen-absorbing alloy powder was used to produce an electrode and the electrode was used to produce a cell in the same manner as Embodiment 1.

The cell thus produced is hereinafter referred to as $X_5$ cell.

(Comparative Example 6)

The alloy powder $M_3$ produced in Comparative Example 4 was subjected to alkaline surface treatment in the same manner as Comparative Example 1. The alloy powder $M_3$ was well rinsed with ion exchange water and dried, thereby producing hydrogen-absorbing alloy powder for electrode.

The hydrogen-absorbing alloy powder was used to produce an electrode and the electrode was used to produce a cell in the same manner as Embodiment 1.

The cell thus produced is hereinafter referred to as $X_6$ cell.

(Comparative Example 7)

The alloy powder $M_3$ produced in Comparative Example 4 was applied acid surface treatment in the same manner as Embodiment 1, and further subjected to alkaline surface treatment in the same manner as Comparative Example 1 without drying. Then, the alloy powder $M_3$ thus treated was well rinsed with ion exchange water and dried, thereby producing hydrogen-absorbing alloy powder for electrode.

The hydrogen-absorbing alloy powder was used to produce an electrode and the electrode was used to produce a cell in the same manner as Embodiment 1.

The cell thus produced is hereinafter referred to as $X_7$ cell.

(Comparative Example 8)

The alloy powder $M_3$ produced in Comparative Example 4 was used as the hydrogen-absorbing alloy powder for electrode. The alloy powder was used to produce an electrode and the electrode was used to produce a cell in the same manner as Embodiment 1.

The cell thus produced is hereinafter referred to as $X_8$ cell.

The ununiform distortion and surface treatment conditions of the hydrogen-absorbing alloys used in the cells $A_1$–$A_2$ of the present invention and cells $X_1$–$X_8$ of Comparative Examples are listed in the following table 1.

TABLE 1

| cells | ununiform distortion | surface treatment conditions |
| --- | --- | --- |
| $A_1$ | $2.5 \times 10^{-3}$ | solution HCl (pH = 1), at 25° C., for 20 mins. |
| $A_2$ | $2.5 \times 10^{-3}$ | alloy pulverization in solution HCl (pH = 1) |
| $X_1$ | $2.5 \times 10^{-3}$ | solution KOH (pH = 14), at 80° C., for 60 mins. |
| $X_2$ | $2.5 \times 10^{-3}$ | after same treatment as $A_1$, same treatment as $X_1$ without drying |
| $X_3$ | $2.5 \times 10^{-3}$ | no treatment |
| $X_4$ | $5.4 \times 10^{-3}$ | solution HCl (pH = 1), at 25° C., for 20 mins |
| $X_5$ | $5.4 \times 10^{-3}$ | alloy pulverization in solution HCl (pH = 1) |
| $X_6$ | $5.4 \times 10^{-3}$ | solution KOH (pH = 14), at 80° C., for 60 mins. |
| $X_7$ | $5.4 \times 10^{-3}$ | after same treatment as $A_1$, same treatment as $X_1$ without drying |
| $X_8$ | $5.4 \times 10^{-3}$ | no treatment |

(Experiments 1)

With regard to the cell $A_1$–$A_2$ of the present invention and the cells $X_1$–$X_8$ of Comparative Examples, their cell internal pressure, high rate discharge characteristics, low temperature discharge characteristics, and charge/discharge cycle life were examined. The results are shown on the following tables 2–5 respectively.

Prior to the experiments, the cells were activated by charging for 16 hours at 100 mA, resting for an hour, discharging at 200 mA until the voltage dropped to 1.0 V, and resting for another hour. This cycle was repeated three times at room temperature.

Each of the experiments was conducted under the following conditions.

(1) Cell internal pressure

The cells were charged at 1000 mA at room temperature and the internal pressure was measured when they were charged 200% (two hours after the start of charging).

(2) High rate discharge characteristics

At room temperature, the cells were charged for 16 hours at 100 mA, rested for one hour, discharged at 4000 mA until the voltage dropped to 1.0 V, and rested for another hour. Then the discharge capacity of each cell was measured.

(3) Low temperature discharge characteristics

At room temperature, the cells were charged for 16 hours at 100 mA, rested for one hour at 0° C., and discharged at 1000 mA at 0° C. until the voltage dropped to 1.0 V. Then the discharge capacity of each cell was measured.

(4) Charge/discharge cycle characteristics

At room temperature, the cells were charged for 48 minutes at 1500 mA, rested for one hour, discharged at 1500 mA until the voltage dropped to 1.0 V, and rested for another hour. The charge/discharge cycle was repeated until the cell capacity reached 500 mAh in order to measure the cycle numbers.

TABLE 2 cell internal pressure

| cells | internal pressure (kgf/cm$^2$) |
| --- | --- |
| $A_1$ | 10.1 |
| $A_2$ | 9.8 |
| $X_1$ | 11.5 |
| $X_2$ | 10.2 |
| $X_3$ | 15.3 |
| $X_4$ | 19.2 |
| $X_5$ | 20.1 |
| $X_6$ | 19.7 |
| $X_7$ | 18.9 |
| $X_8$ | 18.2 |

TABLE 3 high rate discharge characteristics

| cells | discharge capacities (mAh) |
| --- | --- |
| $A_1$ | 905 |
| $A_2$ | 895 |
| $X_1$ | 752 |
| $X_2$ | 767 |
| $X_3$ | 800 |
| $X_4$ | 915 |
| $X_5$ | 904 |
| $X_6$ | 793 |
| $X_7$ | 815 |
| $X_8$ | 850 |

TABLE 4 low temperature discharge characteristics

| cells | discharge capacities (mAh) |
| --- | --- |
| $A_1$ | 904 |
| $A_2$ | 897 |
| $X_1$ | 318 |

TABLE 4-continued low temperature discharge characteristics

| cells | discharge capacities (mAh) |
| --- | --- |
| $X_2$ | 420 |
| $X_3$ | 615 |
| $X_4$ | 917 |
| $X_5$ | 906 |
| $X_6$ | 431 |
| $X_7$ | 487 |
| $X_8$ | 895 |

TABLE 5 charge/discharge cycle

| cells | charge/discharge cycle (times) |
| --- | --- |
| $A_1$ | 1123 |
| $A_2$ | 1154 |
| $X_1$ | 925 |
| $X_2$ | 957 |
| $X_3$ | 917 |
| $X_4$ | 575 |
| $X_5$ | 543 |
| $X_6$ | 602 |
| $X_7$ | 622 |
| $X_8$ | 619 |

As apparent from Table 2, the increase in the internal pressure of the cells $A_1$ and $A_2$ of the present invention were lower than that of the other cells.

As apparent from Table 5, the cells $A_1$ and $A_2$ of the present invention exhibited outstandingly long charge/discharge cycle life. The cells $X_4$ and $X_5$, which had been applied the acid treatment in the same manner as the cells $A_1$ and $A_2$, exhibited short charge/discharge cycle. It seems to result from that too large ununiform distortion of the acid-treated hydrogen-absorbing alloys caused too much pulverization. As a result, the alloys were deteriorated through oxidization, thereby spoiling the charge/discharge cycle characteristics.

With respect to the high rate discharge characteristics and low temperature discharge characteristics shown in Tables 3 and 4, both the cells $A_1$ and $A_2$ of the present invention and the cells $X_4$ and $X_5$ of the Comparative Examples exhibited sufficient values.

The discharge capacities of these cells $A_1$, $A_2$, $X_4$, and $X_5$ were compared with those of the cells $X_3$ and $X_8$ which had been applied no treatment. The comparison reveals that the difference in the discharge capacities is greater among cells $A_1$, $A_2$, and $X_3$ having less ununiform distortion than among cells $X_4$, $X_5$, and $X_8$ having larger ununiform distortion. This means that the acid treatment worked more effectively on the cells $A_1$, $A_2$, and $X_3$.

As apparent from the results of these experiments, the most excellent cells from the view point of the high rate discharge characteristics, low temperature discharge characteristics, and charge/discharge cycle characteristics were cells $A_1$ and $A_2$ which used acid-treated alloys having ununiform distortion of $2.5 \times 10^{-3}$ as an electrode material.

(Experiment 2)

The results of the Experiments 1 proved that the acid treatment did not work on a cell which used a hydrogen-absorbing alloy with large ununiform distortion to improve its charge/discharge cycle.

FIG. 1 shows the relationship between ununiform distortion and charge/discharge cycle life.

Experiment 2 was conducted under the same conditions as the measurement of the charge/discharge cycle characteristics of Experiment 1. The same electrodes and cells were produced as Embodiment 1 and the same acid treatments as Embodiment 1 were applied to hydrogen-absorbing alloys with different ununiform distortion sizes.

For an additional comparison, the hydrogen-absorbing alloys that had not been applied an acid treatment were used to form electrodes and cells in the same manner to examine the charge/discharge cycle characteristics. The ununiform distortion was adjusted through the cooling rate of hydrogen-absorbing alloy melt and the anneal treatment.

As apparent from FIG. 1, alloys whose ununiform distortion was $3.5 \times 10^{-3}$ or less showed satisfactory cycle times.

Furthermore, cells including hydrogen-absorbing alloys which were not subjected to acid treatments were compared with cells including hydrogen-absorbing alloys that had been subjected to acid treatments of the present invention. As a result, acid treatment worked effectively on alloys whose ununiform distortion was less than $4.0 \times 10^{-3}$ to increase their cycle numbers. However, when the ununiform distortion was over $4.0 \times 10^{-3}$, non-acid-treated alloys exhibited more charge/discharge cycle numbers than acid-treated alloys.

Thus, alloys whose ununiform distortion is $3.5 \times 10^{-3}$ or less are best because of their long charge/discharge cycle life and satisfactory effects of the acid treatment.

(Experiment 3)

The relationship between the charge/discharge cycle life and the pH value of a solution to be used for acid treatment was examined. The results are shown in FIG. 2.

Experiment 3 was conducted under the same conditions as the measurement of the charge/discharge cycle characteristics of Experiment 1 by producing electrodes and cells in the same manner as Embodiment 1 except that the pH values in the acid treatment for the alloy powder $M_2$ (ununiform distortion: $2.5 \times 10^{-3}$) were variously changed.

Figure 2:
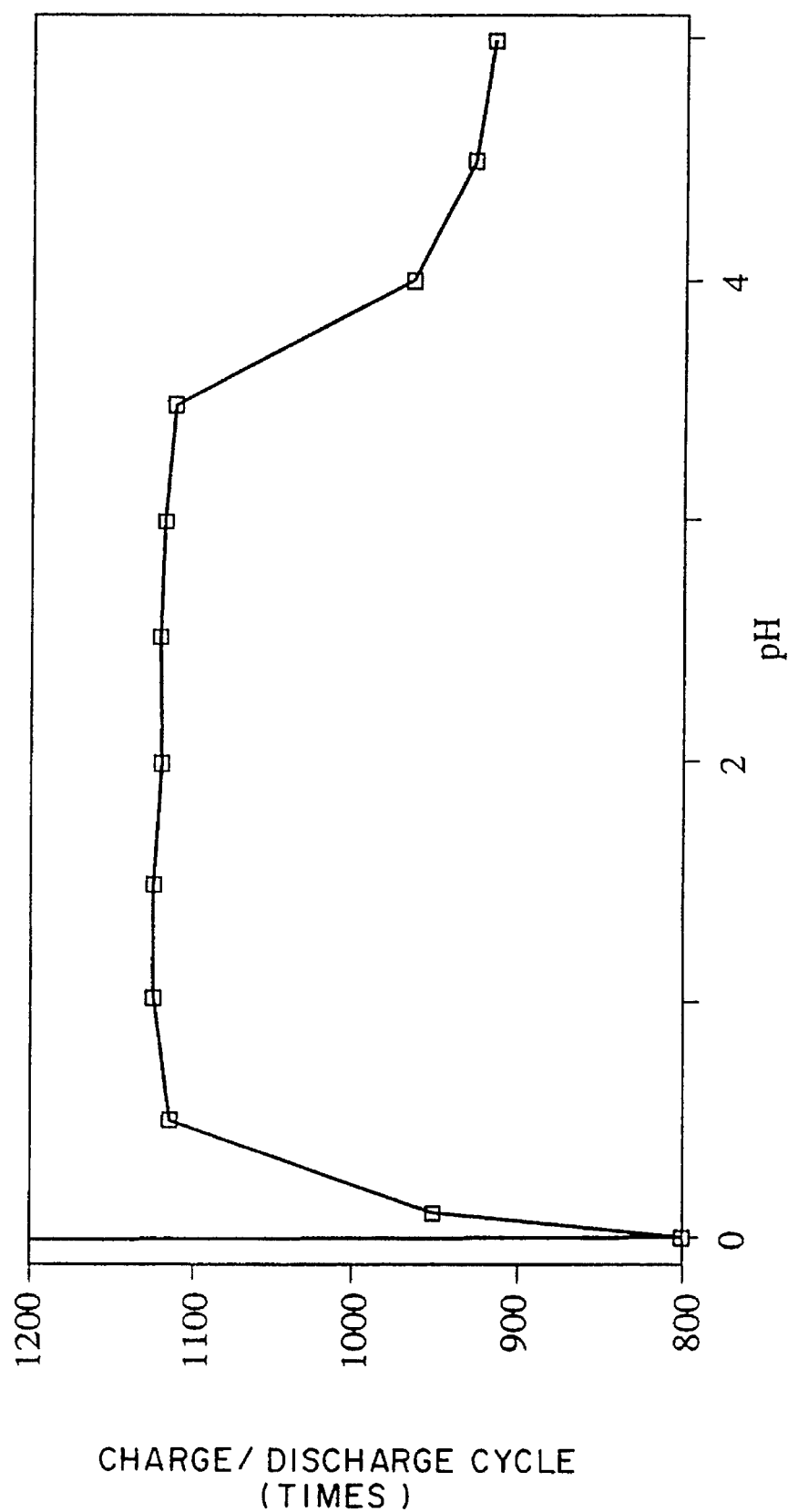
FIG. 2 is a graph showing the relationship between pH values of an acid aqueous solution to be used in an acid treatment and the charge/discharge cycle.

As apparent from FIG. 2, satisfactory charge/discharge cycle life was obtained when the pH value is in a range of between 0.5 and 3.5.

(Experiment 4)

The relationship between the high rate discharge characteristics and pH values of an acid aqueous solution used for the acid treatment was examined. The results are shown in FIG. 3.

Experiment 4 was conducted under the same conditions as the measurement of the high rate discharge cycle characteristics of Experiment 1 by producing electrodes and cells in the same manner as Embodiment 1 except that the pH values in the acid treatment were variously changed.

Figure 3:
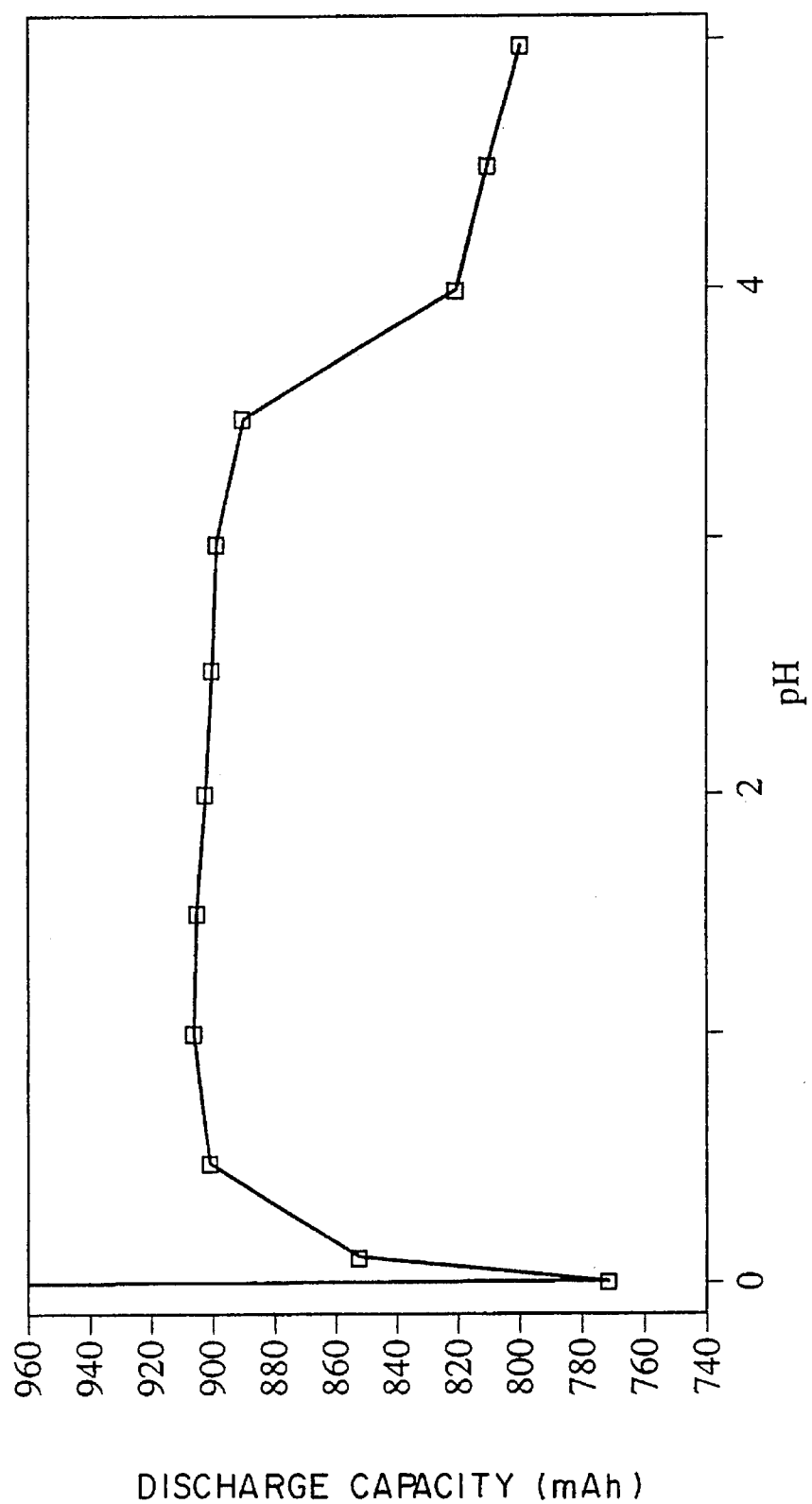
FIG. 3 is a graph showing the relationship between the pH values and high rate discharge characteristics.

As apparent from FIG. 3, satisfactory high rate discharge characteristics were obtained when the pH value was in a range of between 0.5 and 3.5.

(Experiment 5)

As apparent from the high rate charge/discharge characteristics obtained in Experiment 1, the acid treatment works more effectively on alloys with less ununiform distortion than those with larger ununiform distortion for the purpose of raising the high rate charge/discharge characteristics.

Figure 4:
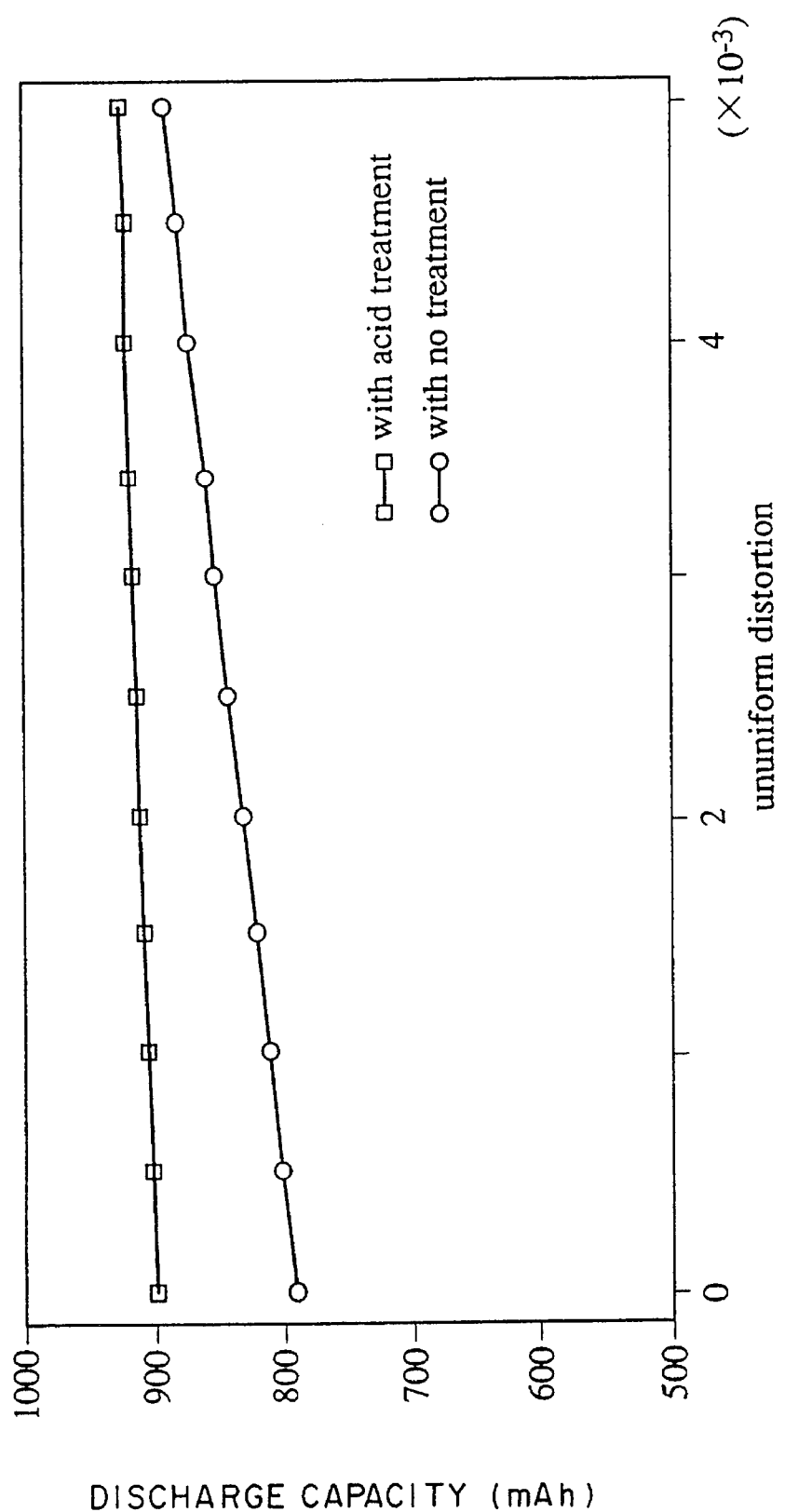
FIG. 4 is a graph showing the relationship between the ununiform distortion and high rate discharge characteristics.

FIG. 4 shows the relationship between ununiform distortion and effects of the acid treatment in the high rate discharge characteristics.

Experiment 5 was conducted as follows.

Hydrogen-absorbing alloy powders having various ununiform distortion were prepared to produce electrodes and cells. Of two alloy powders having a common ununiform distortion, one was subjected to an acid treatment and the other was not.

The ununiform distortion was adjusted through the cooling rate of hydrogen-absorbing alloy melt and anneal treatment.

As apparent from FIG. 4, alloys that had not been subjected to a treatment have low high-rate discharge characteristics because of low alloy activation. On the other hand, cells using hydrogen-absorbing alloys whose ununiform distortion was small were able to improve the high rate discharge characteristics by applying acid treatment.

The relationship between low temperature discharge characteristics and the pH value of the acid aqueous solution and the relationship between ununiform distortion and low temperature discharge characteristics were not shown. The low temperature discharge characteristics, however, contributes to the activity of the hydrogen-absorbing alloy like the high rate discharge characteristics. Consequently, the low temperature discharge characteristics shows the same tendency as the high rate discharge characteristics, obtaining the same results.

Thus, the results of Experiments 2 through 5 have proved that it is preferable to apply an acid treatment to hydrogen-absorbing alloy whose ununiform distortion is $3.5 \times 10^{-3}$ or less by using an acid solution having a pH value of between 0.5 and 3.5.

(Others)

1) Instead of hydrochloric acid used in the Embodiments, another acid may be used as long as its pH value is equivalent because the effects of the present invention results from pH value.

2) Instead of rare-earth metal-Ni hydrogen-absorbing alloy, for example Ti-Ni hydrogen-absorbing alloy may be used to obtain the same effects.

3) The acid treatment is applied when or after a hydrogen-absorbing alloy ingot is pulverized in the embodiments; however, a hydrogen-absorbing alloy that has not applied the treatment may be used to produce an electrode and the electrode may be subjected to acid treatment to obtain the same effects. In this case, the electrode is soaked in an acid aqueous solution for surface treatment, and then rinsed with water and dried.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for producing a hydrogen-absorbing alloy electrode including a step of treating a surface of a hydrogen-absorbing alloy having ununiform distortion of $3.5 \times 10^{-3}$ or less, the surface treatment step being carried out by using only an acid aqueous solution whose pH value is between 0.5 and 3.5.

2. The method of claim 1 further comprising the steps of:

melting and cooling elements composing said hydrogen-absorbing alloy, thereby producing a hydrogen-absorbing alloy ingot;

pulverizing said hydrogen-absorbing alloy ingot into powder, the pulverization step including the surface treatment step; and producing a hydrogen-absorbing alloy electrode from the hydrogen-absorbing alloy powder.

3. The method of claim 2, wherein the surface treatment step is composed of pulverizing said hydrogen-absorbing alloy ingot in the acid aqueous solution.

4. The method of claim 2, wherein an anneal treatment is applied to said hydrogen-absorbing alloy ingot.

5. The method of claim 2, wherein a rate of said cooling is controlled.

6. The method of claim 1 comprising the steps of:

melting and cooling elements composing said hydrogen-absorbing alloy, thereby producing a hydrogen-absorbing alloy ingot;

pulverizing said hydrogen-absorbing alloy ingot into powder; and producing a hydrogen-absorbing alloy electrode from the hydrogen-absorbing alloy powder, said surface treatment step being applied to said hydrogen-absorbing alloy powder between the pulverization step and the production step.

7. The method of claim 6, wherein said surface treatment step is composed of soaking said hydrogen-absorbing alloy powder in said acid aqueous solution.

8. The method of claim 6, wherein an anneal treatment is applied to said hydrogen-absorbing alloy ingot.

9. The method of claim 6, wherein a rate of said cooling is controlled.

10. The method of claim 1 further comprising the steps of:

melting and cooling elements composing said hydrogen-absorbing alloy, thereby producing a hydrogen-absorbing alloy ingot;

pulverizing said hydrogen-absorbing alloy ingot into powder; and producing a hydrogen-absorbing alloy base electrode from the hydrogen-absorbing alloy powder, the surface treatment being applied to said hydrogen-absorbing alloy base electrode after the production step of the hydrogen-absorbing alloy base electrode.

11. The method of claim 10, wherein an anneal treatment is applied to said hydrogen-absorbing alloy ingot.

12. The method of claim 10, wherein a rate of said cooling is controlled.

* * * * *